UNITED STATES PATENT OFFICE.

HORACE H. DAY, OF NEW YORK, N. Y.

IMPROVEMENT IN THE MANUFACTURE OF SHIRRED GOODS.

Specification forming part of Letters Patent No. 26,658, dated January 3, 1860.

*To all whom it may concern:*

Be it known that I, HORACE H. DAY, of the city, county, and State of New York, have invented a new and useful Method or Process of Manufacturing Cemented Elastic Shirred Goods; and I do hereby declare that the following is a full, clear, and exact description of the same.

My invention has reference to the manufacture of cemented elastic shirred goods, or that description of these goods in which the sheets of covering textile material upon opposite sides of an elastic sheet or a parallel series of elastic rubber strands are cemented with each other and with the rubber sheets or strands by a flexible cement. The ordinary mode of manufacturing this description of shirred goods has been to coat the sheets of textile material with a thin coating of a pasty solution of india-rubber, and to evaporate the greater part of the solvent previous to applying the cloths to the rubber strands. The solution of rubber has been applied to the cloth by means of a scraper substantially in the manner described in the English patent of McIntosh, and the evaporation of the solvent has been effected by passing the coated cloth over a heated cylinder or by exposing it in a chamber to the action of hot air. The cloth thus prepared is applied to the rubber strands in an extended state by means of what is known as the "shirring-machine," after which the compound fabric is dried in hot chambers. This mode of manufacture is objectionable. In the first place the fabric produced is never completely freed from the solvent which tends to decompose, rot, or soften the rubber strands, and as the solvents generally used are camphene and naphtha, the goods have an offensive odor. In the second place, as the solvent serves no other purpose than to dilute the rubber, and as it is evaporated as thoroughly as possible before the goods are put in the market, the cost of the solvent is lost.

The object of my invention is to produce this description of goods without the employment of a solvent for the rubber; and it consists of a compound process composed of two operations, viz: first, the coating of the sheets of cloth with an extremely thin sheet of india-rubber or the vulcanizable compound of india-rubber, in contradistinction to a coating of a solution of rubber; and, second, the application of the covered sheets to strands or sheets of india-rubber while the latter are in an extended state or while under tension.

My invention consists, further, in combining with the two foregoing operations the vulcanization of the fabric.

My invention consists, further, in subjecting the compound fabric, prior to its vulcanization and while under tension, to the action of fluted rollers for the purpose of imparting to it the appearance of woolen goods.

In order to effect the first operation of my process, the putty-like india-rubber or vulcanizable compound of india-rubber and sulphur, in the condition in which it comes from the grinding-mill, is spread as thinly as possible upon the cloth by the process and means described in the Letters Patent of the United States granted to Edwin M. Chaffee, the 31st day of August, 1836; and, as no solvent is used, the coated cloth is ready for the subsequent operations without any preliminary drying.

In order to effect the second operation of my process, two sheets of the coated cloth are combined with an elastic sheet or a parallel series of rubber strands in an extended state by means of the shirring-machine for which Letters Patent of the United States bearing date the 19th day of June, 1844, were granted to Horace H. Day the 12th day of October, 1844. In effecting this operation the coated cloth is passed through water previous to its application to the rubber strands, for the purpose of softening the woven fabric and rendering it more impressible.

The second part of my invention is effected by exposing the compound fabric manufactured as above described to heat, in the manner practiced in the vulcanization of the "soft compound" of india-rubber, until the vulcanizable compound is vulcanized; or, in case the cloth has been coated with rubber not combined with sulphur or its equivalent, the vulcanization may be effected by the process of Parkes, described in a patent granted to him in England, which patent was sealed March 25, 1846.

In carrying out the third part of my invention the compound fabric produced in the shirring-machine is pressed between a pair of fluted or crimping rollers while in an extended state and prior to its vulcanization. The pair of rollers used for this purpose should be operated in connection with the shirring-machine, and the longitudinal edges of the rollers should project about one-sixteenth of an inch (more or less) beyond the bottoms of the spaces between them, and be about one-twentieth of an inch apart, the ridges of one roller being opposite the spaces of the other.

In describing my invention I have not deemed it necessary to describe in detail the various machines and apparatus for carrying it into effect, as these are well known to manufacturers of rubber goods, and are in public use.

In carrying out the second operation of my process I use strands of vulcanized rubber prepared in the ordinary way and of a size suited to the quality of the article to be produced; or the rubber may be used in the form of a sheet of the whole breadth of the cloth, or of a series of strips or ribbons placed side by side, their edges being separated more or less; and if an article of low quality is required the coating compound of rubber may be combined with various earthy substances—such as the oxide of lead, litharge, lamp-black—previous to applying it to the cloth. The strands, strips, or sheets should in all cases be formed of vulcanized rubber, so that they may be permanently elastic.

Elastic shirred goods manufactured by my process are free from the smell of the solvents usually employed, and are more durable than goods manufactured by the use of solvents. They can also be manufactured at a less cost, as the cost of the solvent is saved. The subjection of the fabric to the operation of fluted rollers before vulcanization and while under tension is important, as at that stage of its manufacture the coating of rubber or its vulcanizable compound is plastic and void of elasticity, so that it preserves the form imparted to it by the rollers, while after vulcanization the coating becomes permanently elastic and regains its original form after it has been indented, so that the action of rollers at this latter period produces only a temporary indentation of the surface, which speedily vanishes.

I do not claim the separate operation of my process independently of their combination; but

What I claim as my invention, and desire to secure by Letters Patent, is—

1. The compound process herein described for manufacturing elastic shirred goods, consisting substantially of the two following operations—viz., the coating of the covering cloth with a thin coating of india-rubber or the vulcanizable compound of india-rubber and sulphur, or its equivalent, without the use of a solvent, preliminary to the application of the said coated cloth to strands, strips, or sheets of india-rubber, and then the application of the cloth so coated to strands, strips, or sheets of rubber in an extended state.

2. In combination with the compound process above specified, the vulcanization of the fabric produced thereby, the whole invention thus far specified being a compound process composed of three operations.

3. In combination with the said first compound process, subjecting the compound fabric prior to vulcanization and while in an extended state to the action of fluted rollers, or crimping it, substantially as herein set forth, this part of my invention being a compound process, or a combination of three operations.

HORACE H. DAY.

Witnesses:
ALEXANDER HAY,
E. S. RENWICK.